Feb. 25, 1969   L. F. ANDERSON ET AL   3,430,038
PHOTOFLASH ADAPTER
Filed June 1, 1966

LESTER F. ANDERSON
GEORGE W. PARSONS
RONALD G. PETTS
    INVENTORS

BY Joseph C. Ryan
    ATTORNEY

United States Patent Office 3,430,038
Patented Feb. 25, 1969

---

3,430,038
PHOTOFLASH ADAPTER
Lester F. Anderson, Williamsport, George W. Parsons, Hughesville, and Ronald G. Petts, Williamsport, Pa., assignors to Sylvania Electric Products, Inc., a corporation of Delaware
Filed June 1, 1966, Ser. No. 554,511
U.S. Cl. 240—1.3                    2 Claims
Int. Cl. G03b 15/06, 15/035

---

ABSTRACT OF THE DISCLOSURE

A multilamp photographic flashlamp unit, usable with cameras designed to receive a flashcube. The lamps are inserted individually and manually into receiving sockets in the flashlamp unit which also has a means for simultaneously ejecting all of the flashlamps after they have been spent.

---

Figure 1:
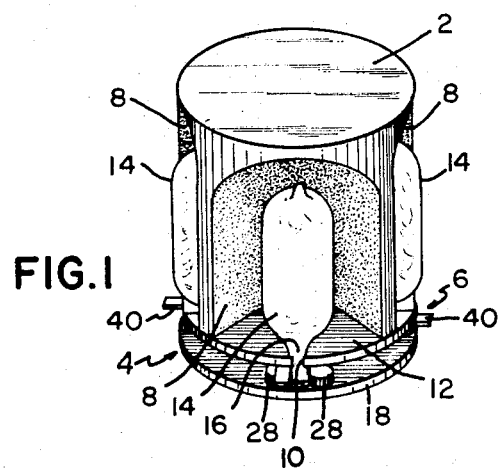

This invention relates to photographic equipment and more particularly to cameras provided with photoflash attachments.

In the photographic art, and in particular in amateur photography, most cameras are provided with some arrangement for receiving photoflash lamps so that the photographer can supplement the available natural and/ or artificial light therewith whenever required. In some cameras, this arrangement takes the form of a built-in reflector with an associated lamp socket connected to a power source. In other cases, the camera is provided with means for receiving a flashgun, an attachment which is readily attachable to and detachable from the camera, when, as and if required. The flashgun attachment usually comprises a reflector, a lamp socket and a power supply.

Over the years, photoflash lamps have been packaged for ultimate use individually, i.e., each time a photographer wished to use a photoflash lamp, he removed one from a package of several and inserted it into the socket provided therefor either in the camera itself or in the flashgun attachment. After the picture had been taken, the photographer had to remove the hot, used flashlamp and disposed of it before he could proceed to take another picture. This is both awkward and time-consuming particularly in more recent years as flashlamps have become smaller and smaller and thus more difficult to handle.

Recently, new flashlamp packaging concepts have been developed whereby several flashlamps are packaged in a unitary structure which includes a separate reflector for each lamp and means for establishing the electrical connections from the lamp to a socket provided therefor in a camera without the necessity for removing the lamps individually from their package each time one is to be used. This unitary structure, comprising several packaged flashlamps, each with its own reflector, hereinafter referred to as a flashcube, makes it unnecessary to provide cameras with built-in reflectors or means for receiving flashguns.

Although many new cameras are being designed to receive the flashcube, these cameras do not include means for enabling the photographer to use other types of flashlamps. This becomes a distinct disadvantage in circumstances where the photographer may wish to have available the additional light which would be obtainable from an AG–1 for example.

In view of the foregoing, a principal object of this invention is to provide an adapter for AG–1 type flashlamps for use with cameras designed to receive flashcubes only.

In accordance with the principles of this invention, there is provided a substantially cylindrical body member having a plurality of reflectorized niches formed therein and within which a plurality of AG–1 type flashlamps are disposed. A base member on which the body member is located includes a ring and central post depending therefrom, the ring and post being of the same shape, size and dimensions as the corresponding members of a flashcube base. Thus the article of this invention will fit on the spindle provided on cameras designed to receive flashcubes and will be rotatable thereon in the same way that the flashcubes are. A star wheel, rotatable about the principal axis of the adapter and disposed between the cylindrical body member and the base member on which it is located, constitutes a camming device for simultaneously dislodging all four spent flashlamps.

Figure 2:
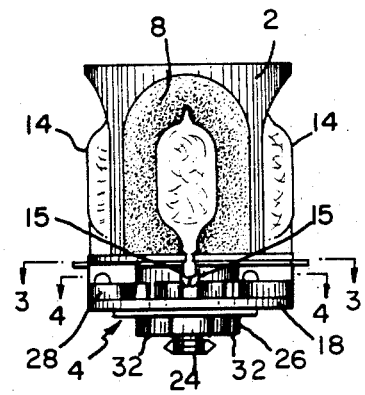
Figure 3:
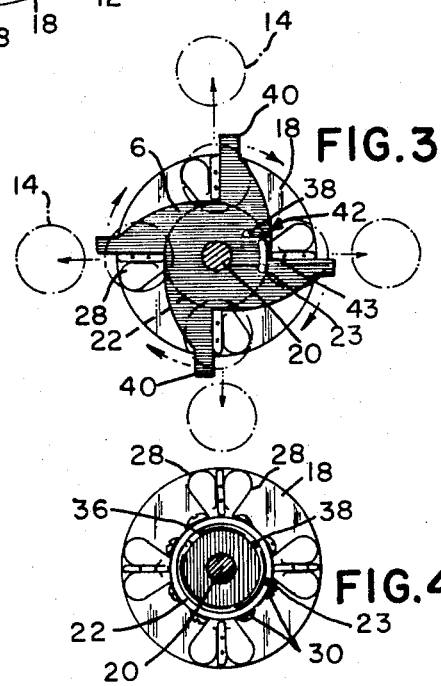
Figure 4:
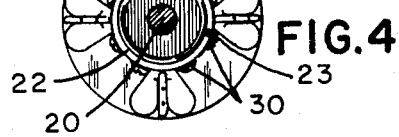

In the accompanying drawing:
FIGURE 1 is a perspective view of a specific embodiment of an adapter embodying the principles of this invention.
FIGURE 2 is an elevational view of the adapter of FIG. 1.
FIGURE 3 is a transverse sectional view taken along the line 3—3 of FIG. 2.
FIGURE 4 is a transverse sectional view taken along the line 4—4 of FIG. 2.

In the specific embodiment of the invention illustrated in the accompanying drawing, the main components of the adapter comprise a substantially cylindrical body member 2, a base member 4 on which the body member is mounted and a star wheel 6 disposed therebetween. The body member 2 is provided with a plurality of reflectorized niches 8 formed in the side wall thereof and a plurality of slots 10 cut into the peripheral edges of the bottom face 12 thereof. Flashlamps 14 of the AG–1 type are disposed within the niches 8, positioning of each flashlamp being effected by insertion of the grooved press 16 thereof into one of the slots 10.

The base member 4 on which the body member is mounted comprises a disk 18 having a central screw 20, a boss 22 and a pin 23, all upstanding thereon and with the screw 20 fitting into the bottom of the body member 2. The bottom of the disk 18 is provided with a central post 24 and a contact ring 26 concentric therewith and both depending therefrom. A pair of spring clips 28, attached to the outer face of boss 22 by screws 30, lie on the top face of disk 18 and are oriented with respect to each of the slots 10 cut in the bottom face of the cylindrical body member 2 so that, when a flashlamp 14 is positioned as noted above, the shaped lead-in wires 15 defining the lamp electrical contacts will be in positive frictional engagement therewith. Wires 32, connected through screws 30 to the spring clips 28, extend through disk 18, are shaped over contact ring 26 and are anchored in disk 18. These wires 32 define the base electrical contacts.

The star wheel 6, disposed between body member 2 and base member 4, is rotatable about screw 20. A wire spring 36, disposed within the boss 22, has one end thereof anchored in disk 18 and the other end thereof is anchored in the star wheel 6 at 38 (FIG. 3). The central portion of star wheel 6 has an elongated slot 43 formed therein and through which pin 23 extends. Arms 40 of star wheel 6 are each provided with a camming face 42 along the leading edge thereof. Thus, discharge of the flashlamps 14 from their normal position seated in the niches 8 in body member 2 may be effected by clockwise rotation of the star wheel 6 and within the limits of the pin 23-slot 43 arrangement as viewed in FIG. 3. As the camming face 42 on the leading edge of each arm 40 moves into engagement with and exerts a force against the tapered press 16 of a flashlamp 14, it overcomes the retaining force exerted by the spring clips 28 and dislodges the lamp from the slot 10. This clockwise rotation of the star wheel 6 loads the wire spring 36. Thus when the star wheel is released the loaded spring 36 returns it to its normal rest position as shown in FIG. 3.

In use, the adapter is provided with four flashlamps 14 of the AG-1 type, each lamp being positioned within the reflectorized niche 8 provided therefor in the body member 2 by insertion of the tapered press 16 thereof into the slot 10 in the bottom face 12 of the body member 2. When so positioned, the lead-in wires 15 of each lamp 14 are in firm frictional engagement with a pair of spring clips 28 which lie beneath the bottom face 12 of the body member 2 and on the top face of disk 18. Electrically, the clips 18 are connected through screws 30 to wires 32 which define base electrical contacts.

The adapter is mounted on a camera in the same manner as a flashcube since the base member 4 thereof is the same structurally as the base member of a flashcube, the post 24 and the contact ring 26 being the same structurally and functionally as the corresponding members on a flashcube, such as shown in the copending application of F. D. Kottler et al., Ser. No. 417,914, now Patent No. 3,327,105, for example. Thus, as in a camera with a flashcube mounted thereon, each time a picture is taken and the film is advanced to the next exposure, the adapter is rotated thereby. After four shots have been taken, the star wheel 6 is rotated clockwise as viewed in FIG. 3 and the camming faces 42 of the arms 40 thereof displace the spent flashlamps from the adapter. The wire spring 36 returns the star wheel 6 to its normal rest position and four fresh lamps may be positioned in the adapter.

While there has been shown and described what is at present considered the preferred embodiment of the invention, it will be obvious to those skilled in the art that various changes and modifications may be made therein without departing from the invention as defined by the appended claims.

What we claim is:
1. A flashlamp adapter comprising: a body member having a plurality of reflectorized niches formed therein for receiving a plurality of flashlamps having lead-in wires extending therefrom; a base member on which said body member is supported, said base member including base electrical contact means connected to said lamp lead-in wires; and means disposed between said body member and said base member for discharging said plurality of flashlamps simultaneously from said plurality of reflectorized niches, said last-mentioned means comprising a rotatable star wheel having a plurality of arms, the leading edge of each defining a camming face for discharging one of said lamps.

2. The combination of claim 1 in which said base member includes socket-engaging means on the bottom thereof.

References Cited

UNITED STATES PATENTS

| | | | |
|---|---|---|---|
| 2,892,073 | 6/1959 | Michatek et al. | 240—1.3 |
| 3,096,025 | 7/1963 | Prochnow | 240—1.3 |
| 3,350,551 | 10/1967 | Whitehead | 240—1.3 |
| 3,360,639 | 12/1967 | Waggerhauser | 240—1.3 |

NORTON ANSHER, *Primary Examiner.*

F. L. BRAUN, *Assistant Examiner.*